United States Patent
Li

(10) Patent No.: US 11,409,301 B2
(45) Date of Patent: Aug. 9, 2022

(54) ITEM TRANSPORT SYSTEM AND METHOD COMBINING STORAGE WITH PICKING

(71) Applicant: Beijing Geekplus Technology Co., Ltd., Beijing (CN)

(72) Inventor: Hongbo Li, Beijing (CN)

(73) Assignee: Beijing Geekplus Technology Co., Ltd., Beijing (CN)

( * ) Notice: Subject to any disclaimer, the term of this patent is extended or adjusted under 35 U.S.C. 154(b) by 593 days.

(21) Appl. No.: 16/463,817

(22) PCT Filed: Jul. 12, 2018

(86) PCT No.: PCT/CN2018/095444
§ 371 (c)(1),
(2) Date: May 23, 2019

(87) PCT Pub. No.: WO2019/140873
PCT Pub. Date: Jul. 25, 2019

(65) Prior Publication Data
US 2019/0302787 A1   Oct. 3, 2019

(30) Foreign Application Priority Data
Jan. 16, 2018   (CN) .......................... 201810038038.6

(51) Int. Cl.
*G05D 1/02* (2020.01)
*G05D 1/00* (2006.01)
(Continued)

(52) U.S. Cl.
CPC ..... *G05D 1/0225* (2013.01); *G05B 19/41865* (2013.01); *G05D 1/0022* (2013.01);
(Continued)

(58) Field of Classification Search
CPC .............. G05D 1/0225; G05D 1/0022; G05B 19/41865; G06Q 10/06316; G06Q 10/0832
See application file for complete search history.

(56) References Cited

U.S. PATENT DOCUMENTS 7,894,933 B2 * 2/2011 Mountz ............... G06Q 10/087
700/214
8,718,814 B1   5/2014 Clark et al.
(Continued)

FOREIGN PATENT DOCUMENTS

| CN | 105517923 | 4/2016 |
|---|---|---|
| CN | 206032359 | 3/2017 |

(Continued)

OTHER PUBLICATIONS

European Search Report dated May 7, 2020 for EP application 18877301.4.
(Continued)

*Primary Examiner* — Ramsey Refai
(74) *Attorney, Agent, or Firm* — Stoel Rives LLP

(57) ABSTRACT

Disclosed is an item transport system. The item transport system includes: a control server, at least one carrying robot, at least one storage container and at least one picking container. The control server obtains order information and container information of items to be transported and integrates the order information with the container information to provide transport information for the at least one carrying robot. The storage container and the picking container are both configured to accommodate items to be stored and items to be picked interchangeably. The carrying robot carries the storage container or the picking container based on the transport information received from the control server. Further disclosed is an item transport method.

20 Claims, 4 Drawing Sheets

(51) Int. Cl.
*G06Q 10/06* (2012.01)
*G06Q 10/08* (2012.01)
*G05B 19/418* (2006.01)

(52) U.S. Cl.
CPC ... *G06Q 10/06316* (2013.01); *G06Q 10/0832* (2013.01); *G05B 2219/32252* (2013.01); *G05D 2201/0216* (2013.01); *Y02P 90/02* (2015.11)

(56) References Cited

U.S. PATENT DOCUMENTS

| | | | | |
|---|---|---|---|---|
| 2008/0166217 | A1* | 7/2008 | Fontana | B66F 9/063 414/800 |
| 2008/0167884 | A1* | 7/2008 | Mountz | G06Q 10/0875 705/29 |
| 2013/0103552 | A1 | 4/2013 | Hoffman et al. | |
| 2015/0098775 | A1 | 4/2015 | Razumov | |

FOREIGN PATENT DOCUMENTS

| | | |
|---|---|---|
| CN | 106779567 | 5/2017 |
| CN | 108107862 | 6/2018 |
| JP | 2010514646 | 5/2010 |
| JP | 2016055966 | 4/2016 |
| WO | 2016130338 | 8/2016 |
| WO | 2017022048 | 2/2017 |

OTHER PUBLICATIONS

"Understanding Order Picking", Nov. 10, 2017, Retrieved from the Internet: URL:https://www.carolinahanding.com/blog/2017/uderstanding-and-improving-orderpicking [retrieved on Apr. 27, 2020].

* cited by examiner

ITEM TRANSPORT SYSTEM AND METHOD COMBINING STORAGE WITH PICKING

CROSS REFERENCE TO RELATED APPLICATIONS

This is a National Stage Application, filed under 35 U.S.C. 371, of International Patent Application No. PCT/CN2018/095444, filed on Jul. 12, 2018, which claims priority to Chinese patent application No. 201810038038.6, filed on Jan. 16, 2018, contents of both of which are incorporated herein by reference in their entireties.

TECHNICAL FIELD

The present disclosure relates to the field of intelligent logistics, and in particular to an item transport system and method.

BACKGROUND

The rapid development of e-commerce and online shopping has brought an opportunity for the logistics and warehousing industry to rise rapidly and an unprecedented challenge to the logistics and warehousing industry. How to improve picking efficiency, reduce time from an order for goods to delivering the goods and reduce a labor burden has always been a big issue to be solved in the logistics and warehousing industry. In a past automatic robot picking system, a goods-to-person mode is a relatively common mode. The goods-to-person mode is based on an intelligent carrying robot. The robot automatically drives to a position directly below a target rack, lifts the target rack and sends the target rack to a picking station according to order demands and inventory information. The picking station is equipped with a display device such as a display screen. The display device prompts location information of a good required in a delivery order. According to the prompt, a person for picking gets the required good from the target rack and puts the required good into a specified container to complete a picking task. After the picking task is finished, the robot sends the target rack back to a specified location. The above goods-to-person mode does not require personnel to move around in the whole process, thereby greatly improving the picking efficiency and reducing labor intensity.

The above robotic solution in the goods-to-person mode usually adopts a tray as a storage container to meet storage requirements, or uses a rack as a picking container to complete a detachable picking service. However, the storage and picking exist in parallel in many business scenarios. How to implement a goods-to-person picking system that integrates the storage with the picking is an issue that needs to be solved urgently in actual businesses.

SUMMARY

Embodiments of the present application provide an item transport system and method to at least partially solve the problem in the related art.

An embodiment of the present application provides an item transport system. The item transport system includes: a control server, at least one carrying robot, at least one storage container and at least one picking container.

The control server is configured to obtain order information and container information of an item (or items) to be transported and integrates the order information with the container information to provide transport information for the at least one carrying robot.

The storage container and the picking container are both configured to accommodate items to be stored and items to be picked interchangeably.

The carrying robot is configured to carry the storage container or the picking container based on the transport information received from the control server.

An embodiment of the present application provides an item transport method. The method includes the steps described below. A control server obtains order information and container information of items to be transported and integrates the order information with the container information to provide transport information for at least one carrying robot. The carrying robot carries a storage container or a picking container based on the transport information received from the control server. The storage container and the picking container are both configured to accommodate items to be stored and items to be picked interchangeably.

DETAILED DESCRIPTION

A detailed description of embodiments of the present application will be given below with reference to the accompanying drawings.

The described embodiments in the present application are merely a part, not all, of embodiments of the present application.

Figure 1:
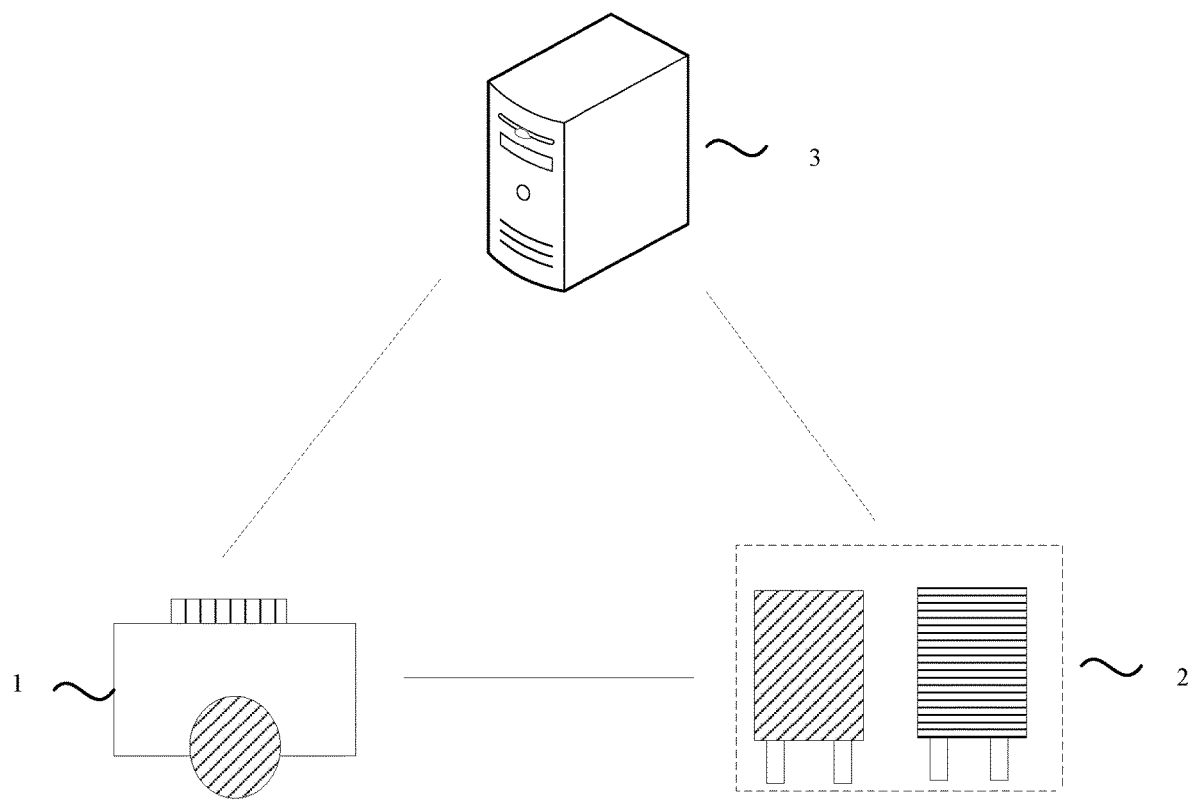
FIG. 1 is a schematic diagram of an item transport system integrating storage with picking according to an embodiment of the present application.

A robot solution in goods-to-person mode usually adopts a tray as a storage container to meet storage requirements, or uses a rack as a picking container to complete a detachable picking service. Because the rack and the tray are of different sizes, usually they are difficult to be used in a mixed manner in the same place. However, storage and picking exist in parallel in many business scenarios. Therefore, how to implement a goods-to-person picking system that integrates storage with picking is an important issue that needs to be solved urgently in actual businesses. The present application is to address the issue. As illustrated in FIG. 1, an embodiment of the present application provides an item transport system integrating storage with picking. The system includes: a control server 3, a storage container and picking container 2 and a carrying robot 1.

The control server 3 obtains order information and container information of an item to be transported and can integrate the order information with the container information, and then provides transport information for the carrying robot 1. The control server 3 has certain computational capabilities and decision-making capabilities.

As for the storage container and picking container 2, a storage container and a picking container may store items interchangeably. The storage container and the picking container are both configured to accommodate goods and be transported by the carrying robot. A picking person/picking robot/automation device pick items from the storage container and the picking container. The picking container is a cube/cuboid shelf and may be divided into multiple layers, and each of the layers may be divided into multiple positions. At the bottom of the rack, there are four symmetrical legs and a height of each leg is larger than a height of the robot to allow the robot to pass. The storage container is also a cube/cuboid shelf and may be a tray or in a multi-layer form. Compared with the picking container, the storage container is characterized by setting at least some larger positions. Storage containers and picking containers are arranged in a rack array with multiple rows and multiple columns. Empty rows/columns provide aisles for the robot to move. Each of the storage containers and the picking containers has a unique identifier (such as Radio Frequency Identification (RFID), a two-dimensional code, or a bar code) to ensure that the identifier of each container has uniqueness. As many types of goods are placed as possible on each rack to enable each rack covers as many orders as possible, thereby reducing transport times of each rack.

The carrying robot 1 selects to carry the storage container or the picking container based on an item transport strategy received from the control server 3. The carrying robot 1 has an autonomous navigation function and can move along a specified route. In addition, the carrying robot 1 further has a lifting mechanism and can lift and put down the container.

Figure 2:
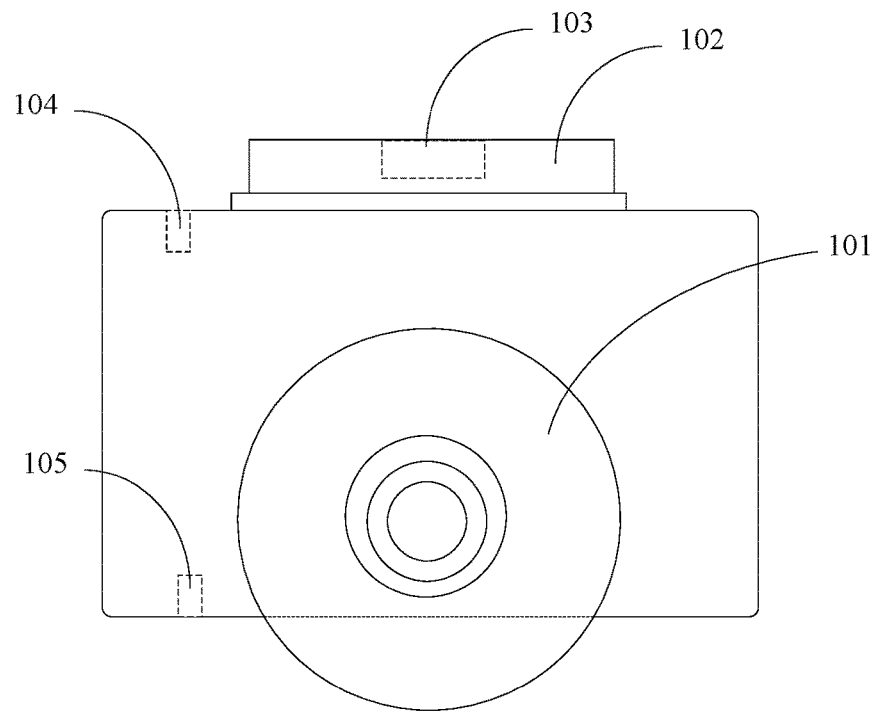
FIG. 2 is a structural diagram of a carrying robot according to an embodiment of the present application.

As illustrated in FIG. 2, the carrying robot 1 may include a drive device 101. The drive device 101 enables the carrying robot 1 to move in a working space. In addition, the carrying robot may further include a docking head 102. When a goods rack is docked, the carrying robot 1 can push, lift and/or otherwise move the goods rack by the docking head 102. The carrying robot 1 may include any suitable components which are configured to dock with the rack and manipulate the goods rack while the rack is docked with the carrying robot 1. For simplicity, FIG. 2 only illustrates a single carrying robot 1. The item storage system may include any appropriate number of the carrying robots 1. An object identification device 103 of the carrying robot 1 may effectively identify the goods rack when the carrying robot 1 approaches the goods rack. In addition, the carrying robot 1 further includes a navigation point identification device 105 configured to identify a navigation point and a control module 104 that controls the whole carrying robot 1 to move and be navigated.

Figure 3:
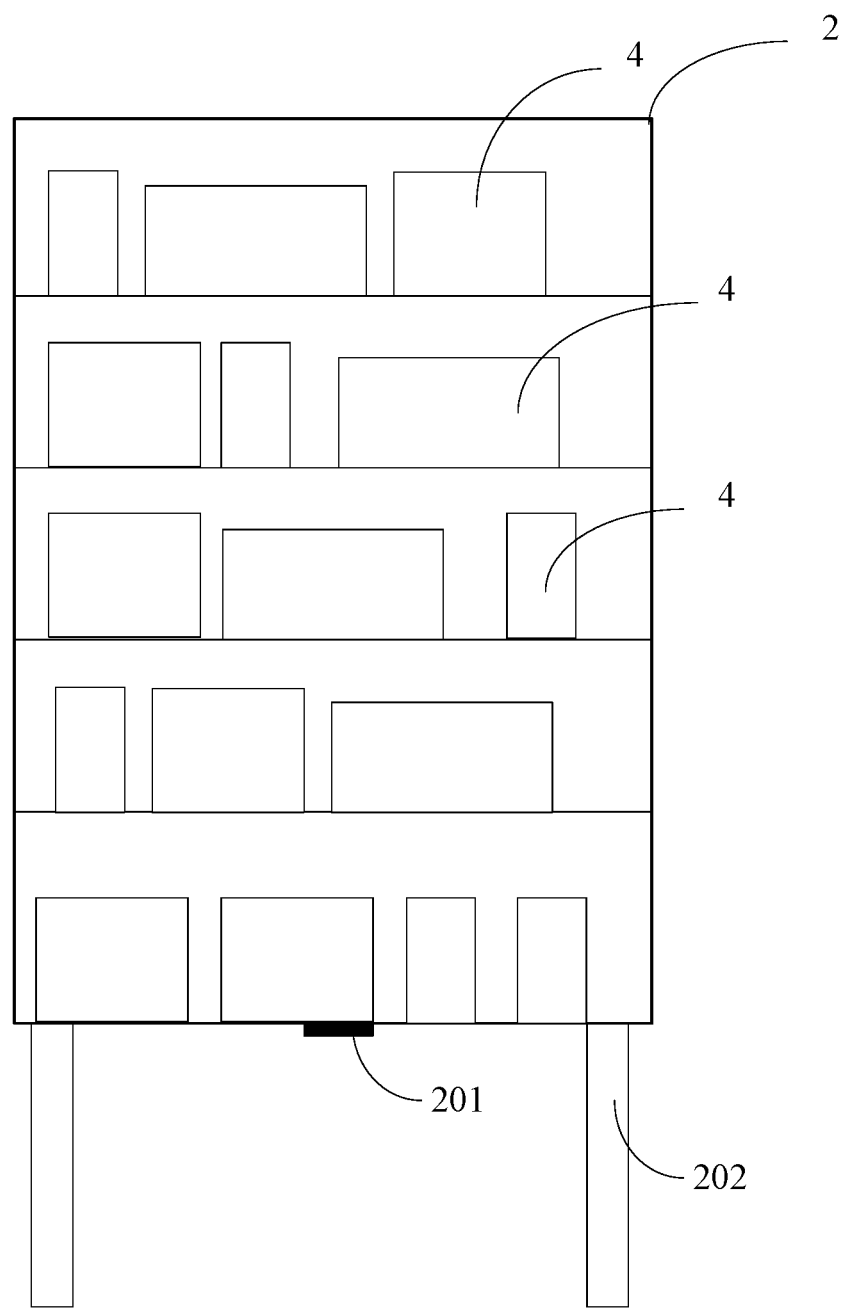
FIG. 3 is a structural diagram of a storage container or a picking container according to an embodiment of the present application.

FIG. 3 is a schematic diagram of a rack according to an embodiment of the present application. The storage container and picking container may be a specific implementation mode of the rack. The rack stores items 4. In an exemplary embodiment, the rack includes a plurality of storage boxes and each storage box can accommodate the item(s) 4. In additional, in an exemplary embodiment, the item(s) 4 may also be hung on a hook or pole within the rack or on the rack. On the rack, the item(s) 4 may be placed within the rack or on an external surface of the rack in any suitable manner. The rack can be rolled, carried or otherwise moved by the carrying robot 1. For the convenience of the carrying robot moving the rack, the rack includes one or more rack supports 202 and a rack identification point 201 that is configured to identify the rack. The item storage system may include any appropriate number of the racks.

The item 4 represents any item suitable to be stored, picked or transported in an automatic inventory, warehouse, manufacturing and/or part processing system. The item 4 may be any material, may be a living object, or may be a lifeless object. As an example, the item 4 may represent an item of merchandise stored in a warehouse. The carrying robot 1 may retrieve a specified rack which contains a specific item 4 associated with a customer order to be packaged for delivery to a customer or elsewhere.

As another example, the item 4 may represent baggage stored in a baggage facility at an airport. The carrying robot 1 may get back a rack which contains the baggage to be transported or tracked. This may include selecting a specific baggage item for explosives screening, moving baggage items associated with a flight whose boarding gate has been changed or removing a baggage item belonging to a passenger who have missed a flight.

As another example, the item 4 may represent various components in a manufacturing toolkit. In an embodiment, these components may represent components intended to be included in an assembled product, such as computer components for customizing a computer system. In such an embodiment, the carrying robot 1 may retrieve specific components identified by specifications related to customer orders.

As another example, the item 4 may represent a person. For example, in a hospital, the rack may represent a bed in which there is a specific patient. Therefore, the item storage system may be configured to a safe and effective system for moving hospital beds, and the system decreases the possibility of a patient injury and reduces the possibility of errors caused by human errors. In summary, the item 4 can be any suitable item stored by a rack in any suitable form.

In a process of operation, the carrying robot 1 can move between points within the working space associated with the item storage system, and can transport the rack between positions in the working space when the carrying robot 1 is coupled to the rack. Based on a received command, the carrying robot 1 may determine a motion destination of the carrying robot 1. For example, in a specific embodiment, the carrying robot 1 may receive information, which is for identifying the destination of the carrying robot 1, from an administrator or an administration device (such as a scheduling server) of the item storage system. The carrying robot 1 may receive the information via a wireless interface, a wired connection or any other suitable component, so that the carrying robot 1 can communicate with an operator or the administration device of the item storage system. Generally, the carrying robot 1 may be controlled, in whole or in part, to move to any desired place based on a command from a control and administration device or an operator.

As an example, in the rest part of the specification, it is assumed that the carrying robot 1 receives wirelessly commands, data, instructions or information constructed in any suitable form. These commands are used for identifying a specific rack to enable the carrying robot 1 to move to a destination to transport the rack. The carrying robot 1 may move the carrying robot 1 and/or the rack by a motor or wheel on the drive device 101.

Figure 4:
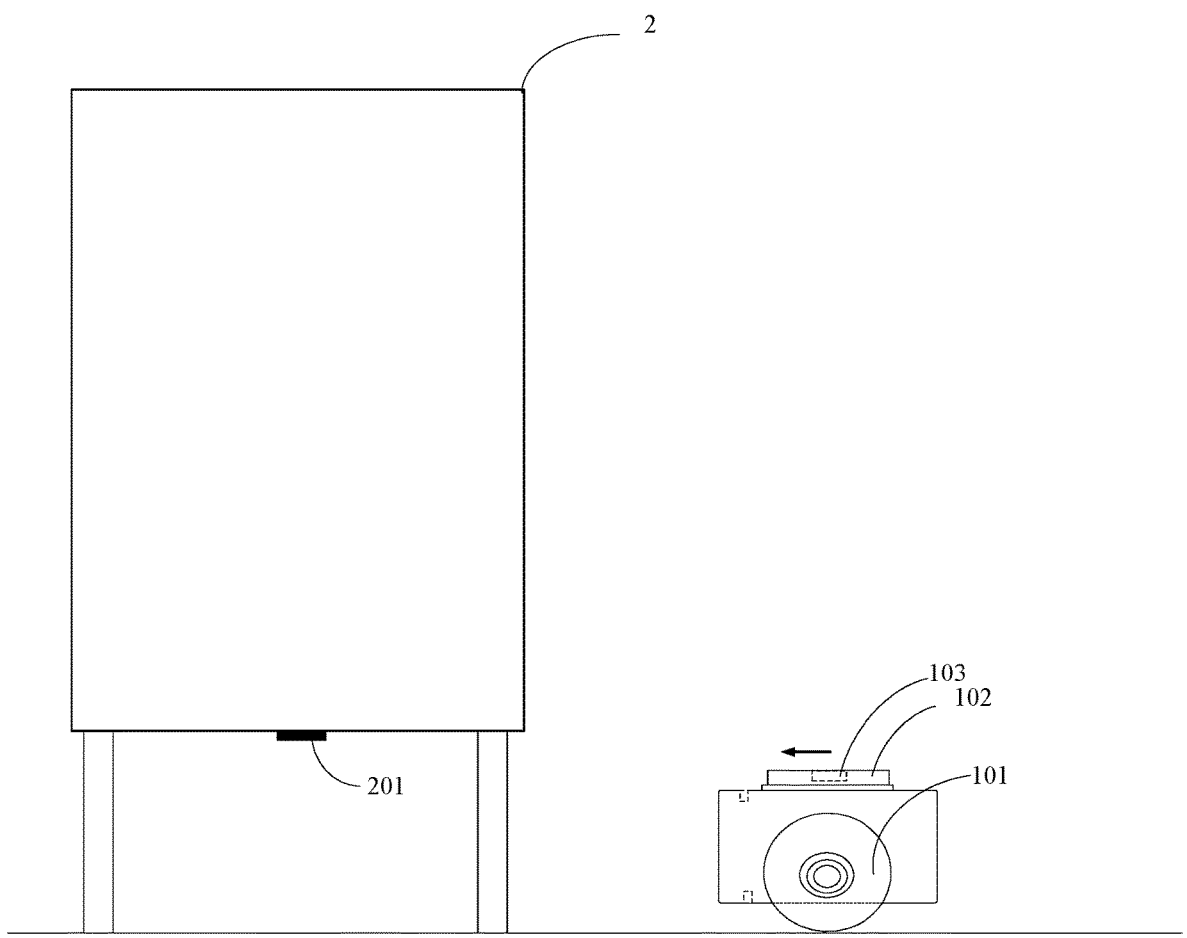
FIG. 4 is a schematic diagram of a carrying robot approaching a rack according to an embodiment of the present application.
Figure 5:
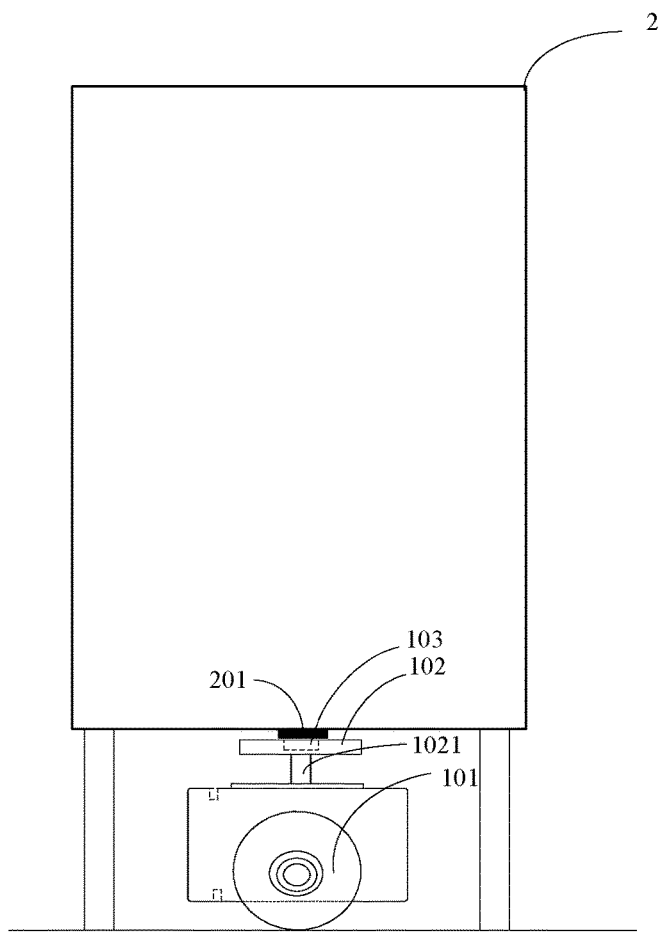
FIG. 5 is a schematic diagram of a carrying robot carrying a rack according to an embodiment of the present application.

In response to the received command, the carrying robot 1 moves to a storage position identified by the command (see FIGS. 4 and 5). The carrying robot 1 may dock with the identified rack. The carrying robot 1 may dock with the rack in any suitable manner, so that the rack is coupled to and/or supported by the carrying robot 1 when the carrying robot 1 docks with the rack. For example, in a specific embodiment, the carrying robot 1 locates itself below an inventory rack to dock with the rack and raises a lift portion 1021 of the carrying robot until the docking head lifts the rack off the floor. In such an embodiment, when the carrying robot 1 docks with the rack, the carrying robot 1 may support all or part of the weight of the rack. In addition, in a specific embodiment, one or more components of the carrying robot 1 may grab one or more components of the rack to grasp, connect to, interlock with or otherwise interact with the one or more components of the rack, so as to from a physical connection between the carrying robot 1 and the rack. In the process of transporting the rack by the carrying robot 1, a position and an orientation of the rack may be adjusted by rotating.

A size of a rack base of the storage container fits a size of the tray (larger than or equal to the size of the tray). Optionally, the size of the rack base is larger than the size of the tray to ensure a certain fault-tolerant space for operation. Various trays have different sizes, and thus the size of the base of the storage container may be adjusted according to a size to be fitted. The base of the storage container may be a square or a rectangle. According to an implementation mode of the embodiment of the present application, the storage container has an item storage position which is larger than an item storage position of the picking container.

According to an implementation mode of the embodiment of the present application, the storage container and the picking container both have the unique identifiers.

According to an implementation mode of the embodiment of the present application, bottoms of both the storage container and the picking container have the identifiers, so that the carrying robot 1 identifies the storage container and the picking container with the identifiers.

According to an implementation mode of the embodiment of the present application, the size of the rack base of the storage container fits the tray size of the carrying robot 1.

According to an implementation mode of the embodiment of the present application, the system further includes a picking station. At the picking station, an item is grabbed out of or placed into the storage container or the picking storage. The picking station may be equipped with an auxiliary device such as a seeding wall with containers, an electronic tag and so on. An auxiliary device, such as a portable device (PAD), a radio frequency (RF) gun, ect., may be used for assisting in racking and picking.

In the racking operation, the control server selects a container according to a heat degree/shipment of an item to be racked and assigns the robot to carry the storage container or the picking container to an operating position, and then an operator, an operating robot or an automation device places the item into the storage container or the picking container.

Alternatively, an item with a larger volume may be racked in the storage container which may store bulky merchandise. An item with a large racking amount/shipment may be racked in the storage container in a relatively large volume (e.g., in a whole box or tray) to improve racking efficiency.

Other items may be racked in the picking container in a relatively small volume. The picking hit rate is increased by increasing types of items in a single picking container, thereby reducing carrying times by the robot and improving picking efficiency. Long tail items may be alternatively racked in the picking container.

The positions to place the storage container and the picking container are not limited. Alternatively, the storage containers and the picking containers with high heat degrees are located close to the picking station, and the storage containers and the picking containers with low heat degrees are located far from the picking station, thereby shortening a carrying distance of the robot. According to an implementation mode of the embodiment of the present application, the control server 3 selects the storage container or the picking container according to the heat degree/shipment of the item to be racked and assigns the carrying robot 1 to carry the storage container or the picking container to the operating position.

According to an implementation mode of the embodiment of the present application, the storage containers and the picking containers with high heat degrees are located close to the picking station, and the storage containers and the picking containers with low heat degrees are located far from the picking station.

The control server determines a target container according to order information, inventory information and a container selection strategy, and assigns an intelligent carrying robot to carry the target container to a target picking station.

According to an instruction of the control server, the operator, the operating robot or the automation device takes the item down from the target container to complete a picking task. For a detachable order, the control server hits a target picking container according to an order or an order group, and increases the hit rate of the target container to reduce the robot's carrying times and improve the picking efficiency. When the number of items hit in the order reaches a certain number or meets a certain standard, the storage container may be used for picking to avoid carrying multiple picking containers for just picking a certain item, thereby improving the picking efficiency and effectively decreasing the frequency of replenishing the picking container.

According to an implementation mode of the embodiment of the present application, for the detachable order, the control server 3 selects the picking container according to the order or the order group.

When an overall inventory of a certain item or some items is less than a set number or meets a certain condition, the control server may replenish the storage container or the picking container by the above-mentioned racking method. When the inventory of a certain item in the picking container is less than a set number or meets a certain condition, the control server may take items out of the storage container to replenish the picking container according to a replenishment strategy.

Figure 6:
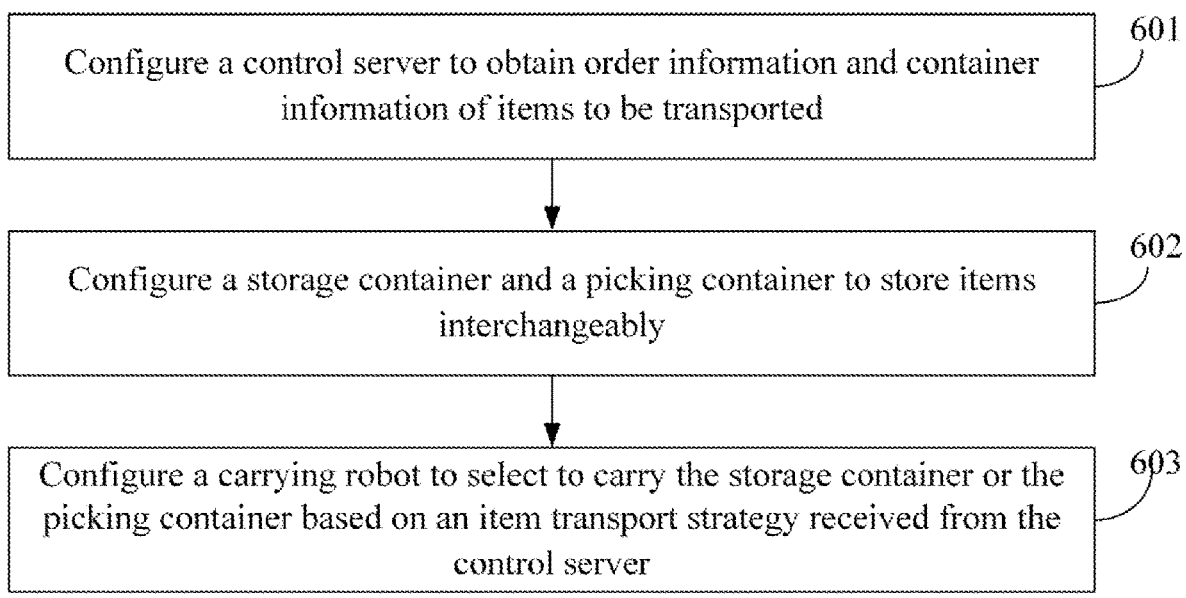
FIG. 6 is a flowchart of an item transport method integrating storage with picking according to an embodiment of the present application.

In addition, as illustrated in FIG. 6, an embodiment of the present application provides an item transport method integrating storage with picking. The method includes the steps described below.

In 601, a control server 3 is configured to obtain order information and container information of an item to be transported.

In 602, a storage container and a picking container are configured to store items interchangeably.

In 603, a carrying robot 1 is configured to select to carry the storage container or the picking container based on an item transport strategy received from the control server 3.

The contents of embodiments of the method corresponds to the contents of the embodiments of the system. What has been described will not be repeated herein.

According to an implementation mode of the embodiment of the present application, a volume of an item storage position of the storage container is larger than a volume of an item storage position of the picking container. Alternatively, a storage quantity of the item storage position of the storage container is larger than a storage quantity of the item storage position of the picking container.

According to an implementation mode of the embodiment of the present application, the method further includes: grabbing an item out of the storage container or the picking container at an operating position when the at least one carrying robot transports the at least one storage container or the at least one picking container; or placing an item into the storage container or the picking container at the operating position when the at least one carrying robot transports the at least one storage container or the at least one picking container.

According to an implementation mode of the embodiment of the present application, the items to be transported include items to be racked, and the method further includes the steps described below. The control server selects the storage container or the picking container according to a shipment of the items to be racked, assigns the carrying robot to put the items to be racked into the selected container and transports them to the operating position. The storage container is selected for the items to be racked whose shipment is larger than or equal to a shipment threshold and the picking container is selected for the items to be racked whose shipment is less than the shipment threshold. Alternatively, the control server selects the storage container or the picking container according to a heat degree of the items to be racked, assigns the carrying robot to put the items to be racked into the selected container and transports them to the operating position. The storage container is selected for the items to be racked whose heat degree is larger than or equal to a heat threshold and the picking container is selected for the items to be racked whose heat degree is less than the heat threshold.

According to an implementation mode of the embodiment of the present application, the items to be transported include items to be picked, and the method further includes the following steps. The control server selects the storage container or the picking container according to the number of the items to be picked, assigns the carrying robot to put the items to be picked into the selected container and transports them to the operating position. The storage container is selected for the items to be picked whose number is larger than or equal to a number threshold and the picking container is selected for the items to be picked whose number is less than the number threshold.

According to an implementation mode of the embodiment of the present application, a storage container, which stores an item/items whose shipment is larger than or equal to the shipment threshold, is at a first distance from the operating position, and a picking container, which stores an item/items whose shipment is less than the shipment threshold, is at a second distance from the operating position. The first distance is less than the second distance.

A storage container, which stores an item/items whose heat degree is larger than or equal to the heat threshold, is at a third distance from the operating position, and a picking container, which stores an item/items whose heat degree is less than the heat threshold, is at a fourth distance from the operating position. The third distance is less than the fourth distance.

According to an implementation mode of the embodiment of the present application, the control server selects the picking container according to a detachable order or an order group consisting of a plurality of the detachable orders.

According to an implementation mode of the embodiment of the present application, an item/items in the storage container are capable of being replenished to the picking container if an inventory of items in the picking container decreases to a preset value.

In the item transport system and method integrating storage and picking provided by the embodiments of the present application, the storage container(s) and the picking container(s) are disposed and the areas for placing different containers are not limited. The container can be selected according to the heat degree/shipment of the item(s), the item(s) with a high heat degree or a large shipment is/are preferably racked in the storage container in a relatively large volume to improve the racking efficiency, and the item(s) with a low heat degree or a small shipment is/are racked in the picking container. When the number of items hit by the order reaches a certain number or meets a certain standard, the storage container may be used for picking, otherwise the picking container is used for picking. When inventory of a certain item in the picking container decreases or meets a certain condition, the item may be taken out of the storage container for replenishing to the picking container according to the replenishment strategy, thereby improving item transport efficiency.

It may be understood that the term "one" should be regarded as "at least one" or "one or more". That is, the number of an element may be one in an embodiment and the number of the element may be multiple in another embodiment. The term "one" should not be considered to limit the number.

Since ordinal numbers, such as "first", "second" and so on, is used to describe various components, the ordinal numbers are not intended to limit these components herein. Those terms are only used to distinguish between one component and another component. For example, a first component may be referred to as a second component, and similarly, the second component may be referred to as the first component, without departing from the concept of the present application. The term "and/or" used herein includes any one or all combinations of one or more listed associated items.

Terms used herein are only used to describe embodiments and not intended to limit the present application. As used herein, a singular form is intended to include a plural from, unless clearly indicated in the context. In addition, it will be understood that the terms "including" and/or "having" used in the specification are intended to mean the existence of the described features, numbers, steps, operations, components, elements or combinations thereof, without excluding the existence or addition of one or more other features, numbers, steps, operations, components, elements, or combinations thereof.

The terms used herein, including technical and scientific terms, have the same meanings as the terms commonly understood by those skilled in the art if the terms are not defined differently. It should be understood that the terms defined in the commonly used dictionaries have consistent meanings with the terms in the existing art.

What is claimed is:

1. An item transport system combining storage with picking, comprising: a control server, at least one carrying robot, at least one storage container and at least one picking container; wherein the control server is configured to obtain order information and container information of items to be transported and integrate the order information with the container information to provide transport information for the at least one carrying robot;

the storage container and the picking container are both configured to accommodate items to be stored and items to be picked interchangeably; and the carrying robot is configured to carry the storage container or the picking container based on the transport information received from the control server; wherein the storage container and the picking container both configured to accommodate items to be stored and items to be picked interchangeably comprises that:
  in a racking operation, the storage container is configured to rack the items to be racked whose shipment is larger than or equal to a shipment threshold and the picking container is configured to rack the items to be racked whose shipment is less than the shipment threshold; or the storage container is configured to rack the items to be racked whose heat degree is larger than or equal to a heat threshold and the picking container is configured to rack the items to be racked whose heat degree is less than the heat threshold; and
  in a picking operation, the storage container is configured to pick the items to be picked whose number of items hit in an order is larger than a number threshold and the picking container is configured to pick the items to be picked whose number of items hit in the order is less than or equal to the number threshold; or the storage container or the picking container is configured to pick the items to be picked according to a preset standard.

2. The item transport system of claim 1, wherein
a volume of an item storage position of the storage container is larger than a volume of an item storage position of the picking container; or
a storage quantity of the item storage position of the storage container is larger than a storage quantity of the item storage position of the picking container.

3. The item transport system of claim 1,
wherein the storage container has a unique identifier, and wherein the picking container has a unique identifier.

4. The item transport system of claim 3, wherein that the storage container has a unique identifier comprises that: a bottom of the storage container has an identifier to enable the carrying robot to identify the storage container by the identifier; and
  wherein that the picking container has a unique identifier comprises that: a bottom of the picking container has an identifier to enable the carrying robot to identify the picking container by the identifier.

5. The item transport system of claim 2, wherein a bottom area of the storage container is larger than or equal to a tray area of the carrying robot.

6. The item transport system of claim 1, further comprising an operating position; wherein
  the operating position is configured to a position at which an item is grabbed out of the storage container or the picking container when the at least one carrying robot transports the at least one storage container or the at least one picking container to the operating position; or
  the operating position is configured to a position at which an item is placed into the storage container or the picking container when the at least one carrying robot transports the at least one storage container or the at least one picking container to the operating position.

7. The item transport system of claim 6,
wherein a storage container, which stores items whose shipment is larger than or equal to the shipment threshold, is at a first distance from the operating position, and a picking container, which stores items whose shipment is less than the shipment threshold, is at a second distance from the operating position, wherein the first distance is less than the second distance;
or
wherein a storage container, which stores items whose heat degree is larger than or equal to the heat threshold, is at a third distance from the operating position, and a picking container, which stores items whose heat degree is less than the heat threshold, is at a fourth distance from the operating position, wherein the third distance is less than the fourth distance.

8. The item transport system of claim 1, wherein the control server is further configured to select the picking container according to a detachable order or an order group comprised of a plurality of detachable orders.

9. An item transport method combining storage with picking, comprising:
  operating a control server to obtain order information and container information of items to be transported and integrate the order information with the container information to provide transport information for at least one carrying robot;
  operating the carrying robot to carry a storage container or a picking container based on the transport information received from the control server; and
  operating both the storage container and the picking container to accommodate items to be stored and items to be picked interchangeably, including:
    in a racking operation, selecting the storage container for the items to be racked whose shipment is larger than or equal to a shipment threshold and selecting the picking container for the items to be racked whose shipment is less than the shipment threshold; or selecting the storage container for the items to be racked whose heat degree is larger than or equal to a heat threshold and selecting the picking container for the items to be racked whose heat degree is less than the heat threshold; and
    in a picking operation, selecting the storage container for the items to be picked whose number of items hit in the order is larger than a number threshold and selecting the picking container for the items to be picked whose the number of items in the order is less than or equal to the number threshold; or selecting the storage container or the picking container for the items to be picked according to a preset standard.

10. The item transport method of claim 9, further comprising:
  grabbing an item out of the storage container or the picking container at an operating position when the at least one carrying robot transports the storage container or the picking container; or
  placing an item into the storage container or the picking container at the operating position when the at least one carrying robot transports the storage container or the picking container.

11. The item transport method of claim 10,
wherein a storage container, which stores items whose shipment is larger than or equal to the shipment threshold, is at a first distance from the operating position, and a picking container, which stores items whose shipment is less than the shipment threshold, is at a second distance from the operating position, wherein the first distance is less than the second distance;
or
wherein a storage container, which stores items whose heat degree is larger than or equal to the heat threshold, is at a distance of a third distance from the operating position, and a picking container, which stores items whose heat degree is less than the heat threshold, is at a distance of a fourth distance from the operating position, wherein the third distance is less than the fourth distance.

12. The item transport method of claim 9, further comprising:
operating the control server to select the picking container according to a detachable order or an order group comprised of a plurality of detachable orders.

13. The item transport method of claim 9, wherein items in the storage container are capable of being replenished to the picking container if an inventory of items in the picking container decreases to a preset value.

14. The item transport system of claim 2, further comprising an operating position; wherein
the operating position is configured to a position at which an item is grabbed out of the storage container or the picking container when the at least one carrying robot transports the at least one storage container or the at least one picking container to the operating position; or
the operating position is configured to a position at which an item is placed into the storage container or the picking container when the at least one carrying robot transports the at least one storage container or the at least one picking container to the operating position.

15. The item transport system of claim 3, further comprising an operating position; wherein
the operating position is configured to a position at which an item is grabbed out of the storage container or the picking container when the at least one carrying robot transports the at least one storage container or the at least one picking container to the operating position; or
the operating position is configured to a position at which an item is placed into the storage container or the picking container when the at least one carrying robot transports the at least one storage container or the at least one picking container to the operating position.

16. The item transport system of claim 4, further comprising an operating position; wherein
the operating position is configured to a position at which an item is grabbed out of the storage container or the picking container when the at least one carrying robot transports the at least one storage container or the at least one picking container to the operating position; or
the operating position is configured to a position at which an item is placed into the storage container or the picking container when the at least one carrying robot transports the at least one storage container or the at least one picking container to the operating position.

17. The item transport system of claim 1, wherein the control server is further configured to take items out of the storage container to replenish the picking container in response to an inventory of the items in the picking container being less than a set number or meeting a condition.

18. The item transport method of claim 9, wherein before operating the carrying robot to carry the storage container or the picking container based on the transport information received from the control server, the method further comprises:
operating the carrying robot to identify the storage container or the picking container according to a unique identifier on a bottom of the storage container or a unique identifier on a bottom of the picking container.

19. The item transport method of claim 9, wherein a volume of an item storage position of the storage container is larger than a volume of an item storage position of the picking container; or
a storage quantity of the item storage position of the storage container is larger than a storage quantity of the item storage position of the picking container.

20. The item transport method of claim 19, wherein a bottom area of the storage container is larger than or equal to a tray area of the carrying robot.

* * * * *